(12) United States Patent
Wiemann et al.

(10) Patent No.: US 8,712,336 B2
(45) Date of Patent: Apr. 29, 2014

(54) DATA UNIT RECEIVER AND SENDER CONTROL METHOD

(75) Inventors: Henning Wiemann, Aachen (DE); Joachim Sachs, Aachen (DE); Michael Meyer, Aachen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1337 days.

(21) Appl. No.: 11/570,116

(22) PCT Filed: Jun. 9, 2004

(86) PCT No.: PCT/EP2004/006266
§ 371 (c)(1),
(2), (4) Date: Dec. 6, 2006

(87) PCT Pub. No.: WO2005/122520
PCT Pub. Date: Dec. 22, 2005

(65) Prior Publication Data
US 2007/0243828 A1    Oct. 18, 2007

(51) Int. Cl.
*H04B 17/00* (2006.01)
(52) U.S. Cl.
USPC .............. 455/67.11; 455/435.2; 455/3.02; 455/517; 455/12.1; 455/202; 375/340; 375/323; 375/341; 375/1; 375/229; 370/60; 370/18; 370/85.6; 370/464; 370/466
(58) Field of Classification Search
USPC ......... 455/67.11, 435.2, 3.02, 517, 12.1, 260, 455/202; 375/340, 232, 341, 1, 229, 231, 375/224, 465; 370/342, 60, 18, 85.6, 464, 370/466, 469, 394
See application file for complete search history.

(56) References Cited

U.S. PATENT DOCUMENTS

| 5,764,646 | A  | * | 6/1998  | Dent ............................ 370/479 |
| 6,728,247 | B1 | * | 4/2004  | Meyer et al. .................. 370/394 |
| 7,991,868 | B2 | * | 8/2011  | Meyer et al. .................. 709/223 |
| 8,155,083 | B2 | * | 4/2012  | Sachs et al. ................... 370/331 |
| 2003/0039250 | A1 | * | 2/2003 | Nichols et al. ................ 370/394 |
| 2007/0064716 | A1 | * | 3/2007 | Sachs et al. ................... 370/412 |
| 2007/0243828 | A1 | * | 10/2007 | Wiemann et al. .......... 455/67.11 |

FOREIGN PATENT DOCUMENTS

WO    WO 99/59300 A    11/1999

OTHER PUBLICATIONS

Iyengar J R et al. "Preventing SCTP Congestion Window Overgrowth During Changeover, draft-iyengar-sctp-cacc-01.txt" Internet Draft, Jun. 30, 2000 XP015003762 IETF.
European Patent Office International Search Report issued Nov. 19, 2004 for PCT/EP2004/006266.

* cited by examiner

*Primary Examiner* — Edward F. Urban
*Assistant Examiner* — Ganiyu A Hanidu

(57) ABSTRACT

A method is described for controlling a data unit receiver or a data unit sender. The data unit receiver or sender comprise a gap response procedure for responding to gaps in the sequence of data units received at the receiver. A reordering detection procedure S12 is provided for detecting a reordering indication indicative of a potential re-ordering of data units in the course of a transmission from sender to receiver, and the gap response procedure is adapted in response to detecting a re-ordering indication.

9 Claims, 6 Drawing Sheets

DATA UNIT RECEIVER AND SENDER CONTROL METHOD

FIELD OF THE INVENTION

The present application relates to a method of controlling a data unit receiver, a method of controlling a data unit sender and to corresponding data unit receivers and senders.

BACKGROUND OF THE INVENTION

The present invention generally relates to the field of communication via data unit transmission. In a data unit communication, a stream of data symbols (e.g. bits or bytes) is divided by a sender into units, sent over an appropriate transmission network to a receiver, and the receiver reconstructs the data symbol stream on the basis of the received data units. Usually, this is performed in the context of a layering scheme, such as the OSI scheme, i.e. where a sending peer of a given protocol receives a data symbol stream from a higher layer, generates data units in accordance with the given protocol to which the sending peer adheres, and passes the generated data units to lower layers. On the receiving side, the receiving peer receives the data units from the lower layer, reconstructs the data symbol scheme, and passes the reconstructed data symbol stream to the higher layer. The concept of dividing a data symbol stream into data units and the concept of layering are well known in the art, such that a further explanation is not necessary here.

It is noted that such sub-divisions of data are referred to by a variety of names, such as packets, segments, frames, protocol data units, service data units, etc. In the context of the present specification and claims, the term "data unit" is used generically to relate to any such sub-division of data for the purpose of communication.

In order to allow the data unit receiver to reconstruct the data symbol stream, it is known to send the data units in an ordered sequence and to provide each data unit with a sequence position identifier, such that the receiver can arrange the received data units in the sequence determined by the sender. It is further known to provide gap detection and response procedures at a data unit receiver for monitoring the sequence position identifiers in received data units for detecting and responding to a gap among the received data units with respect to the ordered sequence. A gap detection mechanism e.g. known from TCP consists in checking whether a received data unit is next in sequence to the last data unit received correctly in-sequence, and if this is not the case, the response procedure consists in sending a so-called duplicate acknowledgement (DUPACK) for a last data unit that was received correctly in-sequence, as a type of feedback message to the data unit sender.

It is furthermore known to implement a corresponding gap response procedure at the data unit sender for responding to a gap that was reported by the data unit receiver. For example, in TCP the data unit sender counts the number of DUPACKs and performs a retransmission of the data unit associated with the gap (i.e. in the TCP case the data unit immediately following the data unit identified in the DUPACK). As can be seen, in the occurrence of a gap in the received data units with respect to said sequence is understood as an indication that the corresponding data unit has probably been lost or irreparably damaged in the course of the transmission from the sender to the receiver.

It is known that a gap in the received data unit with respect to said sequence is not necessarily due to a data unit loss, but may also be due to so-called data unit reordering. Reordering is a phenomenon in which a later sent data unit overtakes a previously sent data unit, e.g. because the previously sent data unit is excessively delayed in the network. As a consequence, it is possible that the data unit receiver will receive the missing data unit that caused the gap to be detected, without the data unit sender necessarily having had to retransmit the missing data unit. This is precisely the reason why in TCP the data unit sender waits the above-mentioned threshold number of DUPACKs before performing a retransmission.

OBJECT OF THE PRESENT INVENTION

It is the object of the present invention to provide improved methods of gap detection and gap response in data unit based communication.

SUMMARY OF THE INVENTION

This object is solved by the subject matter of the independent claims. Advantageous embodiments are described in the dependent claims.

In accordance with the present invention, it is proposed to provide an explicit reordering detection procedure in the data unit receiver and/or the data unit sender. The reordering detection procedure is arranged to detect a reordering indication that is indicative of a potential reordering of data units in the course of a transmission from the sender to the receiver. It is furthermore proposed to then adapt the gap detection and response procedure in the data unit receiver and/or the gap response procedure in the data unit sender in response to a reordering indication.

A reordering indication is any information suitable to indicate that a reordering will take place or has taken place, such that it would not be appropriate to attribute the gap to a data unit loss. The adaptation of the gap detection and response procedure or gap response procedure is accordingly done in such a way that one or more gaps associated with the reordering as indicated by the reordering indication can be judged as due to reordering, such that the reaction on the part of the data unit receiver and/or data unit sender is different than in the case that no reordering indication is detected, in which case the gap or gaps will be assumed to most probably be due to loss.

In other words, by explicitly looking out for a reordering indication and appropriately adapting the gap detection and response procedure at the receiver and/or the gap response procedure at the sender, one may greatly improve the performance over the prior art, in which it was always assumed that the data units should arrive in the same order as they were sent, such that a gap will always primarily be attributable to a data unit loss. By monitoring for and detecting reordering indications, the present invention can make the data unit receiver and/or sender explicitly aware of a reordering, such that the receiver and/or sender can change their response by then assuming that a gap is primarily due to a reordering. By therefore responding more appropriately to the most probable reason for the gap, the overall performance can be improved.

The reordering indication can be defined in any suitable or appropriate way. For example, it can be based on a switch taking place in the path over which data units are being sent. More specifically, in an environment in which the data unit sender and/or receiver know of changes in the path over which the data units are being sent, e.g. the sender has a plurality of paths or channels available and can choose a path appropriately, then by monitoring the transmission parameters of the paths (especially the delay), the sender and/or receiver can estimate whether a change in path will make a reordering probable or even inevitable.

It is noted that the path change could be observed by the sender or the receiver, but could equally well be observed by a node in the network transporting the data units from the sender to the receiver (user plane node), and/or by a node controlling the transport (control plane node). In the latter case, the network node will appropriately signal the path change to the receiver and/or sender.

As an alternative, it is possible that the sender and/or receiver of the data unit communication observe the history of the communication, in which case it is e.g. possible to observe a periodic recurrence of reordering, if the reordering is due to some periodically problem in the transporting network. In this case, the sender and/or receiver can monitor the system time, and when the system time is in a range associated with the predicted recurring reordering, this can be judged as a reordering indication.

The adapting in response to detecting a reordering indication can be done in any suitable or desirable way. For example, it may consist in simply disabling the gap response procedure. In other words, although a gap is detected, nothing is done in response. Taking a TCP receiver as an example, this means that no DUPACK would be issued. The disabling of the gap response on the side of the sender would e.g. mean that a received DUPACK is not counted in view of determining whether the DUPACK threshold has been exceeded or not.

As an alternative for a sender that employs a gap response procedure with a DUPACK threshold, it is possible to increase the DUPACK threshold as a response to detecting a reordering indication.

On the side of the data unit receiver, the adapting of the gap detection and response procedure preferably consists in dividing the received data units into at least two groups in dependence on the reordering indication, and then applying the gap detection and response procedure separately to the two groups. "Separately" means that the receiver looks for a gap within each group, but not between the groups. Such a mechanism is better than completely disabling the gap detection and response, but avoids responding to a gap that can most probably be attributed to a reordering and not to a data unit loss.

BRIEF DESCRIPTION OF FIGURES

The above advantages and further advantages and aspects of the invention will become more understandable from a study of the detailed embodiments, which are provided in the following and which make reference to the appended figures, in which.

DETAILED DESCRIPTION OF EMBODIMENTS

Although some of the following examples will make reference to specific layers, such as the link layer, the network layer or the transport layer, and to specific protocols, such TCP, the present invention is by no means restricted to any specific communication layer or any specific protocol. The present invention may be applied in the context of any data unit based communication in which data units are sent in an ordered sequence, and in which gap detection and response procedures are employed.

Figure 1:
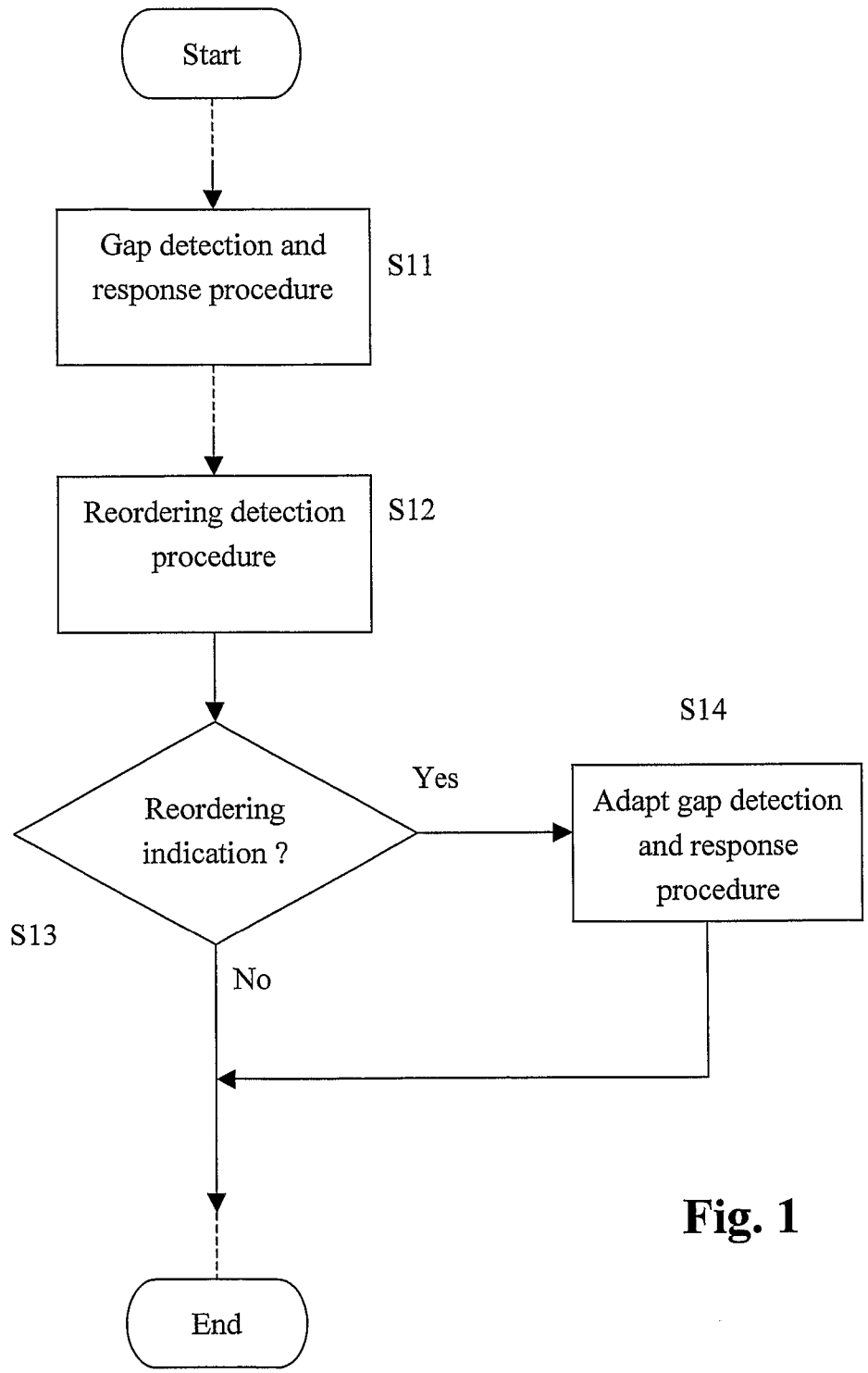
FIG. 1 shows a flow chart of a method embodiment for controlling a data unit receiver.

FIG. 1 shows a flow chart of a control method for a data unit receiver. It is noted that the flow chart only shows elements that are relevant for the present invention, and that further conventional and known elements of a data unit receiver control method are not shown so as to not obscure the teaching of the invention. The method of FIG. 1 comprises a gap detection and response procedure S11 for monitoring sequence position identifiers in received data units and detecting and responding to gaps among the received data units with respect to the order sequence.

The gap detection procedure can be chosen in any suitable or desirable way, e.g. it may consist in determining whether a presently received data unit is next in the sequence to the data unit last received before the presently received data unit, and detecting a gap if the presently received data unit is not next is said sequence to the data unit last received before the presently received data unit. This procedure can also be modified by determining whether a presently received data unit is next in the sequence to the data unit last received in-sequence before the presently received data unit and detecting a gap if this is not the case.

A further possibility of performing a gap detection in the received data units can consist in waiting for the receipt of a predetermined number of data units, and then examining whether the predetermined number of data units are consecutive with respect to the predetermined sequence. For example, if the predetermined number is four, and the data unit receiver receives the four data units with sequence position identifiers in the following order: 3, 4, 6 and 5, then the data unit receiver may judge that there is no gap, as these four received data units can be arranged into a consecutive sub-sequence. On the other hand, the previously described method of checking whether the presently received data unit is next in sequence to the last data unit received would have judged a gap, due to the data unit with sequence position identifier 6 following the data unit with sequence position identifier 4.

The gap response procedure performed by the data unit receiver may also be chosen in any suitable or desirable way. It preferably consists in the sending of appropriate feedback message to the data unit sender, informing the data unit sender of the detected gap. For example, this can be done by sending a DUPACK, as described previously.

The dotted arrows above and below step S11 in FIG. 1 are intended to indicate that the control method will generally comprise further steps and procedures, which, however, have no relation to the present invention and are therefore not described.

The example of FIG. 1 furthermore has a reordering detection procedure S12. The reordering detection procedure S12 is arranged for detecting a reordering indication that is indicative of a potential reordering of data units in the course of the transmission from the sender to the receiver. The reordering indication can be chosen in any suitable or desirable way. For example, it can be an information sent to the receiver by the data unit sender or by a network node involved in the transportation of data units from the sender to the receiver. Equally, the receiver itself may monitor certain communication parameters and derive a reordering indication therefrom.

Figure 4:
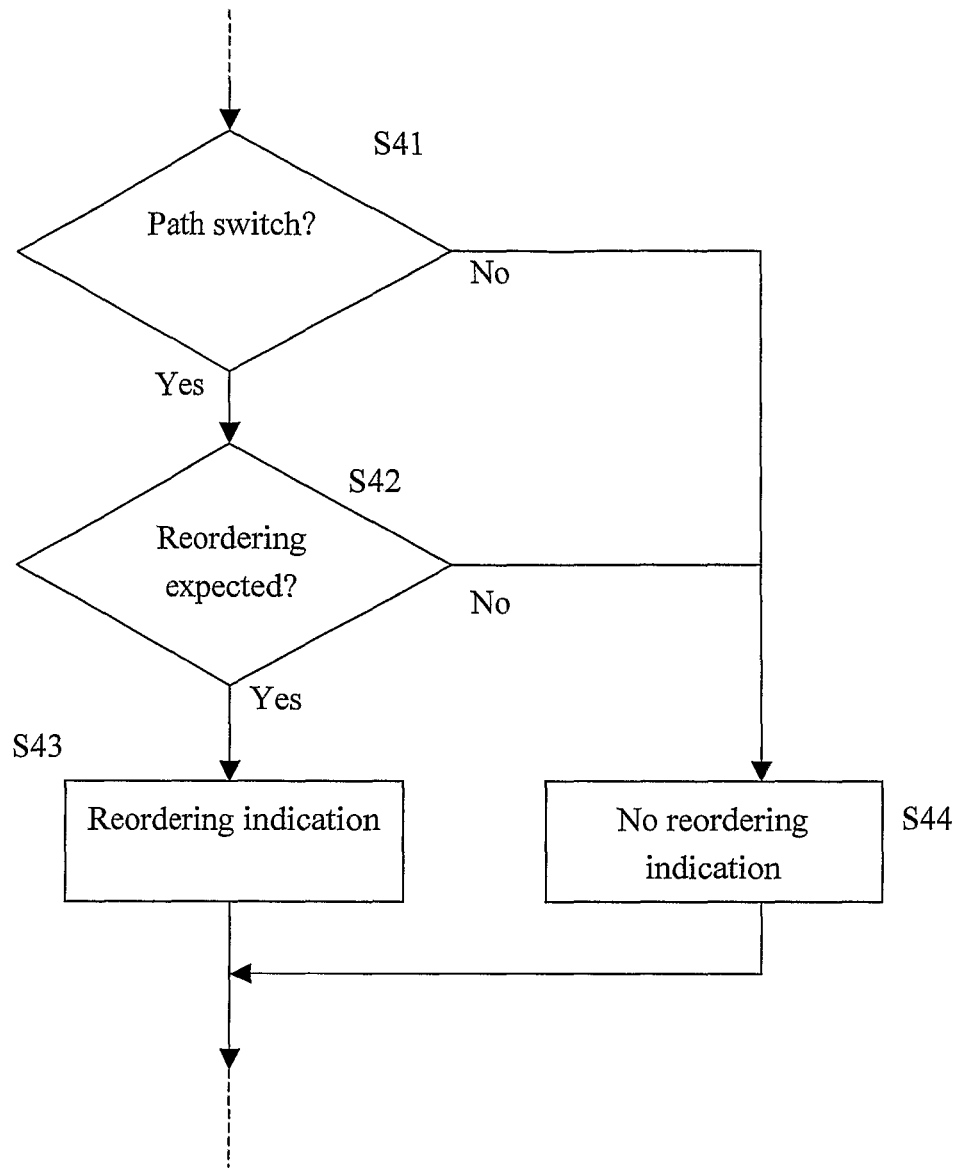
FIG. 4 shows a flow chart of an example for detecting a reordering indication on the basis of a path switch.

An example of this will be described in connection with FIG. 4. The flow chart of FIG. 4 shows method steps that may be performed by reordering detection procedure S12 of FIG. 1. The example of FIG. 4 relates to a situation in which the receiver may receive data units over at least two different paths, and a switching may occur between the paths. The reordering indication can then be caused by said switching of paths. In a first step S41, it is determined if a path switching has occurred. If YES, then decision step S42 examines whether a reordering due to the switching is likely. This can, e.g. be done by analysing the delay associated with the two paths. As a general remark, it is noted that when switching from a path with high delay (slow path) to a path with low delay (fast path) it is possible that data units sent over the fast path overtake previously sent data units on the slow path, i.e. a reordering can be expected under certain conditions. The condition for an expected reordering is e.g. given if $d_{slow} > f \cdot d_{fast}$, where $d_{slow}$ and $d_{fast}$ are the estimated transmission delays for the slow channel and fast channel, respectively. f is a predetermined factor for establishing a threshold above which the receiver can expect that the switching from the slow path to the fast path will lead to a reordering. Consequently, in order to perform the decision step S42 of FIG. 4, the data unit receiver may keep an estimate of the delays over available transmission paths. Such delay information may e.g. be regularly measured by the data unit sender on the basis of the time that passes between the sending of a given data unit and the receipt of a feed back message reporting the correct receipt of said data unit, (e.g. an acknowledgement message ACK) where the data unit sender regularly reports the delays to the data unit receiver. Dedicated delay measurement schemes can also be used, such as the echoing done with a so-called ping.

If the outcome of step S42 indicates that reordering can be expected, then step S43 judges the presence of a reordering indication, and otherwise S44 judges that no reordering indication is present.

The procedure of FIG. 4 is preferably implemented on the sender side, as the sender can determine that an expected reordering is given if tslow+dslow>tfast+dfast, where tslow and tfast are the moment of the last data unit transmission over the slow channel and fast channel, respectively, and dslow and dfast are the estimated transmission delays for the slow channel and fast channel, respectively. The sender can monitor both the times $t_{slow}$ and $t_{fast}$ as well as keep constant estimates of the delays $d_{slow}$ and $d_{fast}$. If the procedure of FIG. 4 is implemented at the sender side, then step S43 furthermore comprises sending an appropriate signal or message to the receiver, such that the receiver can judge the receipt of the reordering indication as a detection. For example, such a reordering indication can be set as a predetermined bit or bit string in the protocol header of a data unit. Further, the reordering indication can also be signalled to the receiver in some other way, e.g. via a dedicating signalling connection.

Figure 3:
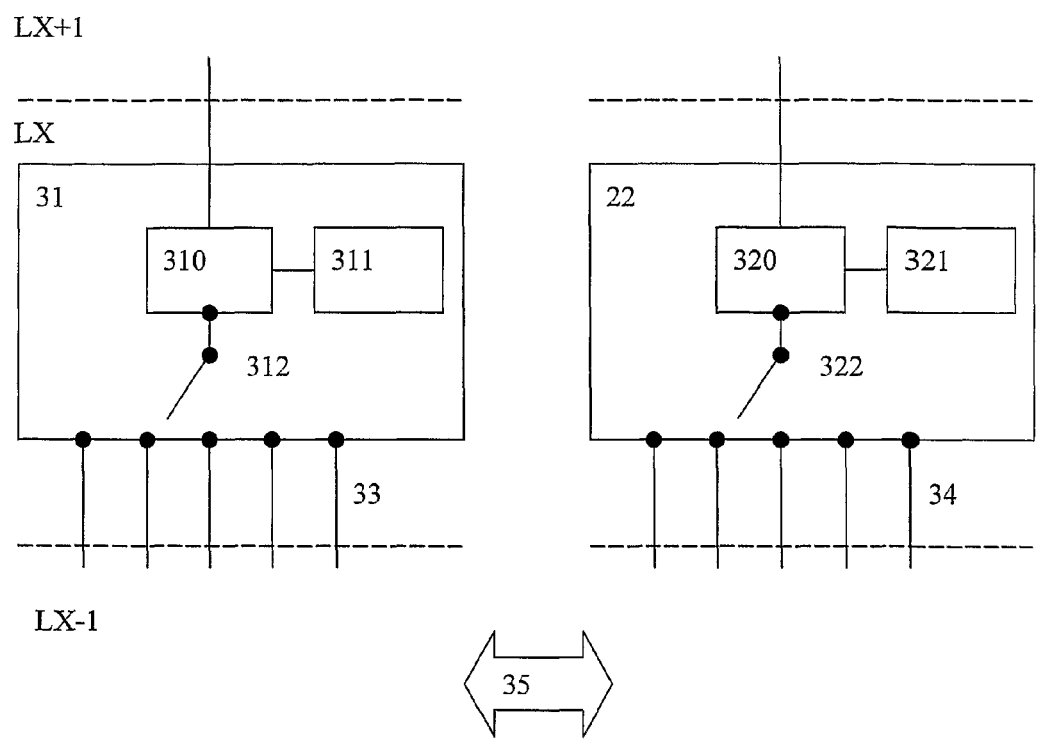
FIG. 3 schematically shows a sender and a receiver that may communicate over a plurality of paths, and which may thereby detect a reordering indication on the basis of a path switching.

FIG. 3 schematically shows an example of a situation in which a sender and receiver may communicate over a plurality of paths that may have different delay characteristics. A sender 31 of a predetermined layer LX sends data units to its peer 32. The layer LX can e.g. be the link layer L2, the network layer L3 or the transport layer L4. The sender 31 receives a stream of data symbols from the higher layer LX+1. Sender 31 comprises a data unit generating part 310, e.g. a buffer, and a control part 311, e.g. a processor for controlling the data unit generating part 310. Furthermore, it is assumed that a plurality of channels 33 for lower layer LX−1 exist, and that the sender 31 comprises a switching part 312 for selecting a channel. Layer LX−1 (and possibly layers below LX−1) provides a connection 35 to the receiver 32, where the data units arrive over channels 34 that correspond to the channels 33. Consequently, the receiver 32 has a switching part 322 for receiving data units from the appropriate channels 34, and the data units are processed in a part 320 that serves to reconstruct the data symbol stream under control of a control part 321. The reconstructed data symbol stream is passed to the higher layer LX+1.

For example, if LX is the link layer L2, then the various channels 33, 34 can e.g. relate to a variety of different physical communication paths, such as a variety of WCDMA (wide band code division multiple access) connections, a HSDPA (high-speed down link packet access) connection, a GSM (global system for mobile communication) connection, a WLAN (wireless local area network) connection or some other type of other wireless connection. The control methods of the present invention can then be implemented at a layer above the channels, e.g. a so-called generic link layer (GLL).

Although the application of the concepts of the present invention to a generic link layer is a preferred embodiment, the invention is by no means restricted thereto. The invention is equally well suited for application to any reliable transport protocol that can transmit over multiple paths, such as SCTP (stream controlled transport protocol) or any appropriate newer versions of TCP (transmission control protocol) that provide multi-path transportation.

Returning to FIG. 4, step S42 can e.g. be implemented in receiver 32 in such a way that the control part 321 keeps a record of delays for the channels 34 (which delays can e.g. be measured by sender 31 and regularly reported to receiver 32), and whenever a switching occurs at switching element 322, control part 321 compares the delay on the old channel and the delay on the new channel, and if the delay on the new channel is smaller than the delay on the old channel by a predetermined threshold amount, then the presence of a re-ordering indication is judged.

Equally well, the method of FIG. 4 could be implemented in control element 311 of sender 31, where step S42 can then consist in determining whether $t_{slow} + d_{slow} < t_{fast} + d_{fast}$ for judging whether a re-ordering indication is present or not, as explained above.

Beyond the sender or receiver determining the presence of a re-ordering indication, it is also possible that a network node involved in the handling of the data units provides the re-ordering indication to the receiver and/or sender. Namely, it is possible that a switching between different available paths occurs in the network, and one or more network nodes keep track of delay conditions on the available path. Then, similar to the above considerations, a network node can judge the presence of a re-ordering indication and subsequently inform a receiver and/or sender. This can be done e.g. by setting a dedicated bit or bit stream in a data unit being forwarded by the node, or over dedicated signalling connections. If the information is sent by setting a bit or a bit stream in a data unit being forwarded, then the information can be sent to the sender via mirroring at the receiver, i.e. the receiver takes the bit or bit stream and sets it in a feedback message (e.g. an ACK) directed towards the sender.

Returning to FIG. 1, if step S13 determines that a re-ordering indication is present, then the procedure branches to step S14 in which a gap detection and response procedure performed in step S11 is appropriately adapted. This adapting can be done in any suitable or desirable way and will generally depend on the specifics of the gap detection and response procedure S11. Generally speaking, the adaptation will be such as to make the response performed by S11 to a gap suitable for a re-ordering instead of for a data unit loss being the cause of the gap.

For example, the adapting can consist in simply disabling the response to detecting a gap. This disabling can be upheld for a predetermined time period, and if no further re-ordering indication is detected as being present during this time, the gap detection and response procedure returns to its previous ("normal") state of treating a detected gap as a probable data unit loss. As an example, if the response to detecting a gap in S11 is the sending of a DUPACK, then the disabling means that during the above specified time period no DUPACK is sent if a gap is detected.

Preferably, the adapting is done in a less coarse fashion by dividing the received data units into at least two groups in dependence on the re-ordering indication, and applying the gap detection and response procedure separately to the groups.

"Separately" means that a gap is looked for within each group, but not between the groups.

The re-ordering indication can be associated with a given data unit. This association can be given e.g. in that the re-ordering indication is a specific marker in that given data unit, and identifies the given data unit as the first one sent over a faster path (path with less delay), such that the receiver considers the data units received prior to the given data unit as belonging to a first group and the given data unit and those received thereafter as belonging to a second group. The gap detection procedure will then look for a gap in the first group or in the second, but not between the two groups. For example, the data units with the sequence position identifiers 2, 3, 4 and 5 have been sent over a slow path, whereas the data units with sequence position identifiers 6, 7, 8, . . . were sent over a fast path, then the data unit sender may mark data unit number 6 with a re-ordering indication. Then, if a receiver receives data units with sequence identifiers 2, 3 and thereafter the data unit with sequence position identifier 6, it is capable of distinguishing the first group that ends at sequence position identifier 5 and the second group that begins with sequence position identifier 6. In this way, if after e.g. having received data units with sequence position identifiers 7, 8 and 9, the slower data units 4 and 5 arrive, no gap is detected, as the respective sub-sequences in the two groups are in order. On the other hand, if e.g. after having received the faster data units 7, 8 and 9, the receiver receives data unit 5 but not data unit number 4, then a gap in the first group may be detected.

It is noted that in the above example the association between the given data unit and the re-ordering indication was provided by the fact that the re-ordering indication was contained in the given data unit. As an alternative, the association can also be established temporarily, namely in that the arrival time or the detection time of the re-ordering indication serves as a delimiter for defining the first and second group. In other words, the first data received after this delimiting time is considered as the first data unit of the second group.

Another possibility of dividing the received data units into at least two groups can be given by associating the re-ordering indication with a range of sequence position identifiers and dividing the received data units into at least two groups by considering data units having a sequence position identifier within the range as belonging to a first group and the data unit having a sequence position identifier outside the range as belonging to one or more second groups. For example, the sender can signal at certain times (in particular when a switch of channels or paths occurs) to the receiver which range of data units can be expected to be received in-order. This range can e.g. be identified by a first sequence position identifier and a last sequence position identifier that are the delimiters of the range. Naturally, several such in-sequence ranges can be specified. The receiver then adapts the response procedure by looking for gaps only within the in-sequence ranges, but not outside the borders or such ranges. For example, if the in-sequence ranges {7-10} and {1-6} have been specified, and due to re-ordering the data units are received in the order {0,7,8,9,10,1,2,3,4,5,6}, then the gap detection procedure would not detect a gap. (In contrast thereto, the conventional approach would have interpreted the reception of data unit 7 as a loss of data units 1-6.) On the other hand, if e.g. data units 8 and/or 4 would be missing, then the gap detection procedure would judge a gap to be present. The detection of such a gap could then trigger the response of the transmission of a feedback message, which preferably also only reports about the in-sequence ranges.

Figure 2:
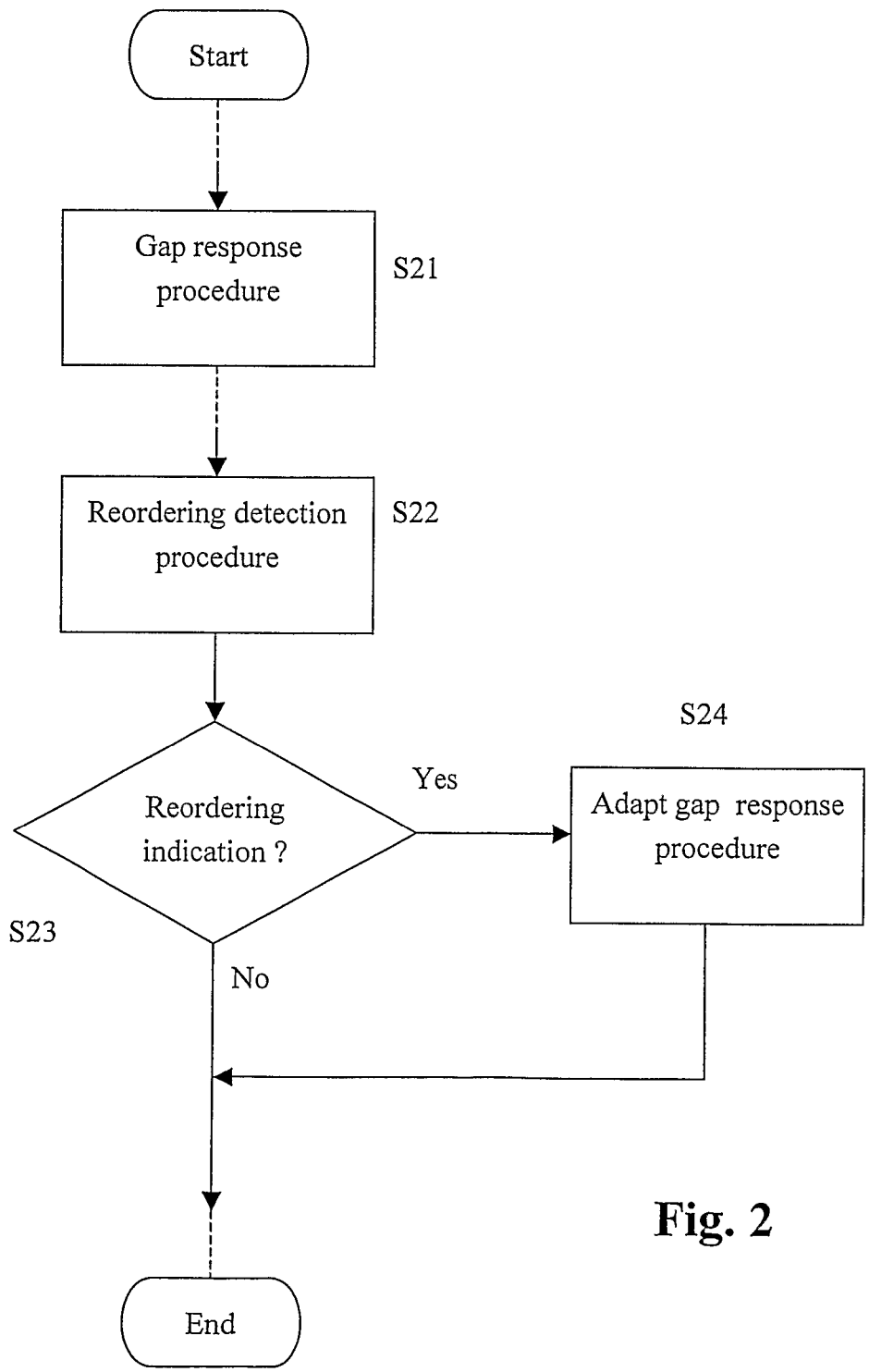
FIG. 2 shows a flow chart of a method embodiment for controlling a data unit sender.

FIG. 2 shows an example of a method of controlling a data unit sender in accordance with the principles of the present invention. Similar to what was already explained in connection with FIG. 1, FIG. 2 only shows elements relevant for the present invention, and other conventional control steps and procedures are not depicted. This is indicated by the dotted arrows. The method of FIG. 2 comprises a gap response procedure S21 for responding to a gap among data units received at the receiver with respect to the ordered sequence. The gap response procedure can e.g. comprise analysing the feedback messages received from the receiver and responding by re-transmitting those data units corresponding to gaps under predetermined conditions, e.g. after receiving a predetermined number of feedback messages identifying a particular gap in the sequence.

The method of FIG. 2 furthermore comprises a re-ordering detection procedure S22 for detecting a re-ordering indication indicative of a potential re-ordering of data units in the course of the transmission from the sender to the receiver. The re-ordering detection procedure S22 can be arranged in the same way as already explained above in connection with step S12 of the receiver control method. Namely, step S22 can be implemented by the method of FIG. 4 at the sender, where in the event of a path switch the comparison between $t_{slow}+d_{slow}$ and $t_{fast}+d_{fast}$ in the described way provides a judgement of a re-ordering indication being present or not. Preferably, step S22 is implemented in such a way that the data unit sender keep track of the communication conditions and appropriately determines when a re-ordering can be expected. Moreover, it is equally well possible that the data unit sender receives the re-ordering indication from the data unit receiver or from a network node involved in the handling of the data units. Then, if the outcome of the re-ordering detection procedure S22 is such that step S23 determines the presence or a re-ordering indication, the gap response procedure is adapted in step S24.

The adapting performed in step S24 can e.g. consist in disabling the response normally performed by gap response procedure S21 to a gap among the received data units. For example, the response can consist in counting DUPACKs, such that the disabling of the response means that the DUPACKs are not counted in view of a possible re-transmission after receiving a predetermined threshold number of DUPACKs. Alternatively, a disabling can consist in not performing re-transmissions. It is noted that similar to the implementation of the disabling feature at the data unit receiver, implementation at the data unit sender will also preferably be done in such a way that the disabling is done for a predetermined time period, and if no further re-ordering indication is received within the time period, then the gap response procedure returns to its "normal" state and again responds to gaps by assuming that the gaps are probably associated with a data unit loss.

As an alternative, in such a case where the gap response procedure S21 comprises counting a number of feedback messages that identify a gap in the sequence, comparing the counted number with a threshold value and re-transmitting one or more data units associated with the gap if the threshold value is exceeded, the adapting performed in step S24 preferably comprises increasing the threshold value in response to detecting a re-ordering indication. For example, in a data unit sender operating similar to TCP, where the DUPACK threshold is 3, the detection of a re-ordering indication would e.g. lead to the DUPACK threshold being increased to a predetermined higher value, such as 10. Again, it is preferable that a timer is set, such that if no further re-ordering indication is detected within a predetermined time period, the value of the threshold is returned to its original value, which is preferably set in accordance with assuming that a gap is associated with a data unit loss.

The concept of the present invention has up to now been described in terms of control methods for a data unit receiver or a data unit sender. As such, the present invention can also be embodied as a computer program product that comprises a computer program, which if executed on a data unit sender or data unit receiver, performs all of the steps and procedures of the above described methods.

Figure 5:
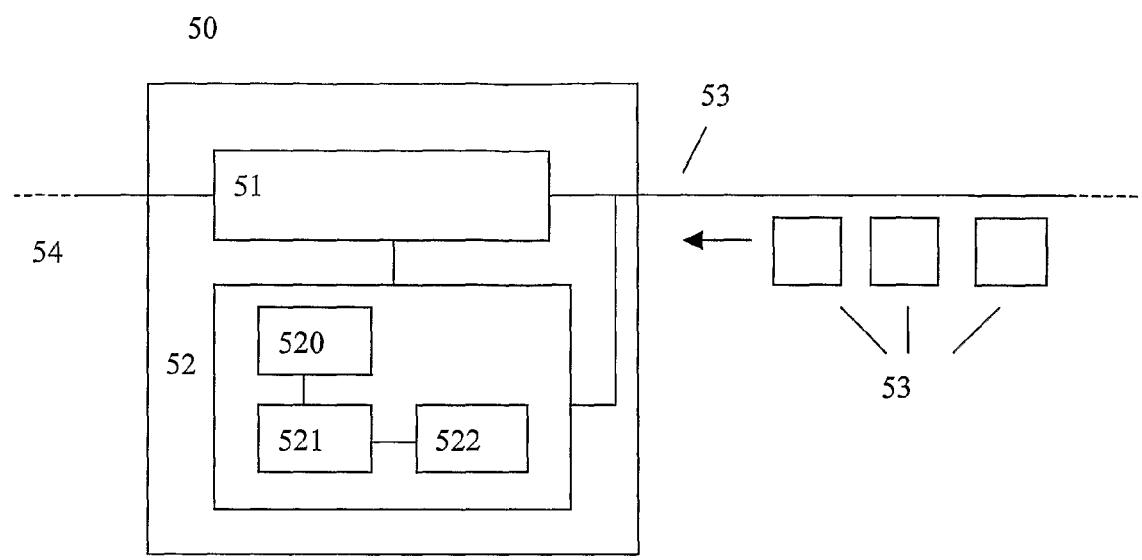
FIG. 5 shows a schematic embodiment of a data unit receiver.

The present invention can furthermore be embodied in the form of a data unit receiver or data unit sender. FIG. 5 shows a data unit receiver 50 that is connectable to a network (not shown) via a connection 53, in order to receive data units 54 from a sender over said network. The sender is arranged to send the data units 54 in an ordered sequence, where each data unit 54 comprises a sequence position identifier, thereby allowing the receiver 50 to place the data units in the correct order of the sequence. The receiver 50 comprises a data unit processing part 51 (similar to part 320 of FIG. 3) and a control part 52 (similar to part 321 of FIG. 3). The control part 52 specifically comprises a gap detector 520 for monitoring the sequence position identifier in the received data units and detecting and responding to a gap among the received data units with respect to the ordered sequence. Furthermore, the control part 52 comprises a re-ordering detector 522 for detecting a re-ordering indication indicative of a potential re-ordering of data units in the course of the transmission from the sender to the receiver, and furthermore comprises an adaptor 521 for adapting the gap detector 520 in response to detecting a re-ordering indication. After reconstructing the original data stream from the received data units 54, this data stream can be passed to a higher layer via connection 55.

It is noted that the control part 52, as well as the gap detector 520, the re-ordering detector 522 and the adaptor 521 can be provided as hardware, software or any suitable combination of hardware and software. Preferably, the control part 52 is a programmable processor, and the gap detector 520, the re-ordering detector 522 and the adaptor 521 are code parts of a computer program running on the processor.

Figure 6:
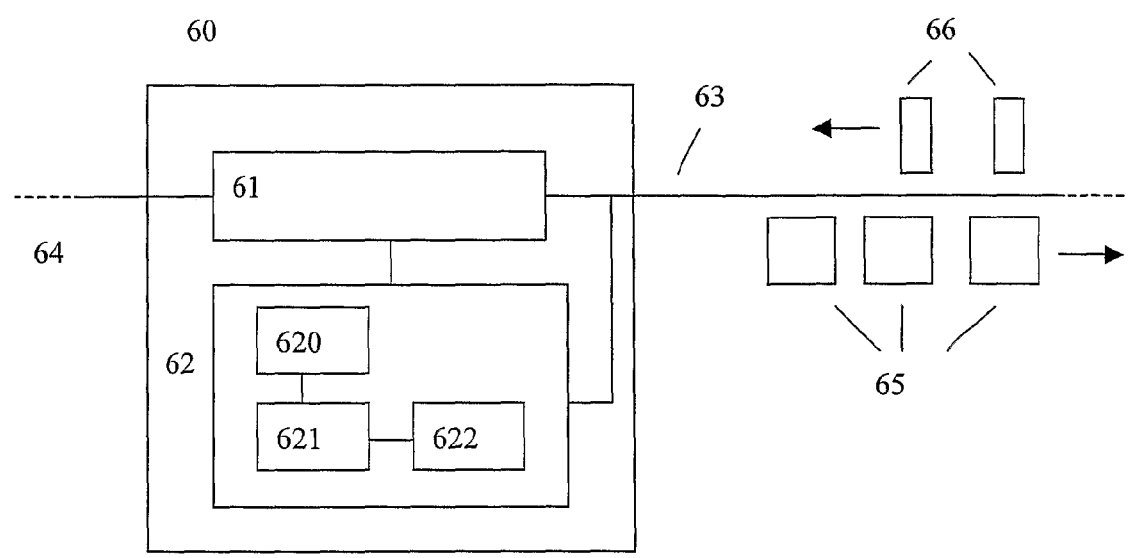
FIG. 6 shows a schematic embodiment of a data unit sender.

FIG. 6 similarly shows a schematic example of a data unit sender 60 that is connectable to a network (not shown) via a connection 63 to send data units 65 to a receiver over the network. The sender 60 is arranged to send the data units 65 in a ordered sequence, where each data unit 65 comprises a sequence position identifier. The receiver sends feedback messages 66 back to the sender 60, which feedback messages provide information on gaps with respect to the ordered sequence among the data units received at the receiver. The sender 60 comprises a data unit generating part 61 (similar to part 310 of FIG. 3) and a control part 62 (similar to control part 311 of FIG. 3). The control part 62 comprises a gap responder 620 for responding to a gap among the data units received at the receiver with respect to the ordered sequence, as well as a re-ordering detector 622 for detecting a re-ordering indication indicative of a potential re-ordering of data units in the course of the transmission from the sender to the receiver, and an adaptor 621 for adapting the gap responder 620 in response to detecting a re-ordering indication.

The control part 62 as well as the gap responder 620, re-ordering detector 622 and adaptor 521 can be provided as hardware, software or any suitable combination of hardware and software. Preferably, the control part 62 is a programmable processor, and the gap responder 620, re-ordering detector 622 and adaptor 621 are code parts of a computer program running on the processor.

Although the present invention has been described by making reference to specific embodiments, these only serve to provide a more thorough understanding and are not intended to be limiting. Much rather, the scope of the present invention is determined by the appended claims. Reference signs in the claims serve to make the claims easier to read, but are not intended to have any limiting effect.

The invention claimed is:

1. A method of controlling a data unit receiver arranged to receive data units from a sender over a network, said sender being arranged to send said data units in an ordered sequence, each data unit comprising a sequence position identifier, the method comprising:
  a gap detection and response procedure in said data unit receiver for monitoring said sequence position identifier in said data units and detecting and responding to a gap among said data units with respect to said ordered sequence,
  a reordering detection procedure in said data unit receiver for detecting a reordering indication that is indicative of a potential reordering of data units in a course of a transmission from said sender to said data unit receiver, and
  adapting said gap detection and response procedure in response to detecting said reordering indication so as to make a response to said gap suitable for said re-ordering indication instead of for a data unit loss being a cause of said gap,
  wherein adapting said gap detection and response procedure comprises:
  dividing said data units into at least two groups in dependence on said reordering indication, and
  applying said gap detection and response procedure separately to said groups.

2. The method of claim 1, wherein said gap detection and response procedure comprises:
  determining whether a presently received data unit is next in said ordered sequence to a data unit last received before said presently received data unit, and
  detecting a gap if said presently received data unit is not next in said ordered sequence to said data unit last received before said presently received data unit.

3. The method of claim 1, wherein said data unit receiver is arranged to receive said data units over at least two paths, and said reordering indication is caused by a switching between said at least two paths.

4. The method of claim 1, wherein said reordering indication is signaled to said data unit receiver by one or both of said sender and a node of said network.

5. The method of claim 1, wherein said reordering indication is associated with a given data unit, and said dividing of said data units into at least two groups comprises:
  considering said data units received prior to said given data unit as belonging to a first group and said given data unit and said data units received after said given data unit as belonging to a second group.

6. The method of claim 5, wherein said reordering indication is a predetermined marker in said given data unit.

7. The method of claim 1 wherein said reordering indication is associated with a range of sequence position identifiers, and said dividing of said data units into at least two groups comprises considering data units having a sequence position identifier within said range as belonging to a first group and said data units having a sequence position identifier outside of said range as belonging to one or more second groups.

8. The method of claim 7, wherein said range of sequence position identifiers is signaled to said data unit receiver by said sender.

9. A data unit receiver for receiving data units from a sender over a network, said sender being arranged to send said data units in an ordered sequence, each data unit comprising a sequence position identifier, said data unit receiver comprising:

a gap detector for monitoring said sequence position identifier in said data units and detecting and responding to a gap among said data units with respect to said ordered sequence, reordering detector for detecting a reordering indication that is indicative of a potential reordering of data units in a course of a transmission from said sender to said data unit receiver, and an adaptor for adapting said gap detector in response to detecting said reordering indication so as to make a response to said gap suitable for said re-ordering indication instead of for a data unit loss being a cause of said gap, wherein said adaptor for adapting said gap detector is configured to:

divide said data units into at least two groups in dependence on said reordering indication; and adapt said gap detector to detect and respond to gaps in separate ones of the at least two groups of data units.

\* \* \* \* \*